United States Patent
Shimomura

(10) Patent No.: US 6,207,252 B1
(45) Date of Patent: *Mar. 27, 2001

(54) MAGNETIC RECORDING MEDIUM AND PRODUCTION METHOD THEREOF

(75) Inventor: Osamu Shimomura, Sunnyvale, CA (US)

(73) Assignee: Verbatim Corporation, Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,792

(22) Filed: Jun. 24, 1998

(51) Int. Cl.$^7$ .................................................. G11B 5/733
(52) U.S. Cl. ....................... 428/141; 428/323; 428/336; 428/694 BS; 428/694 BR; 428/900; 428/328; 428/329
(58) Field of Search ..................... 428/141, 323, 428/336, 694 BS, 694 BR, 900, 328, 329

(56) References Cited

U.S. PATENT DOCUMENTS

| | | | |
|---|---|---|---|
| 4,975,322 | * | 12/1990 | Hideyama et al. ................. 428/323 |
| 5,202,810 | * | 4/1993 | Nakamura .......................... 360/135 |
| 5,512,350 | * | 4/1996 | Ryoke et al. ...................... 428/141 |
| 5,737,229 | * | 4/1998 | Bhushan .......................... 364/468.24 |

OTHER PUBLICATIONS

Sayles, R.S. and Thomas, T.R. "A Stochastic Explanation of Some Structural Properties of a Ground Surface" Int J. Prodn. Res. vol. 14 pp 641–655 1976.*

* cited by examiner

*Primary Examiner*—Stevan A. Resan
(74) *Attorney, Agent, or Firm*—Fenwick & West, LLP

(57) ABSTRACT

A magnetic recording medium is formed on a non-magnetic support and a magnetic layer containing a binder and a ferromagnetic powder and having a thickness of 0.7 μm or thinner is formed on the non-magnetic support wherein the surface roughness Ra of the surface of the medium is from 0.5 to 7 nm and the skewness $R_{SK}$ of the surface of the medium is 0.1 or lower.

The magnetic recording medium preferably has a nonmagnetic underlayer containing a binder and non-magnetic particles such as carbon black, between the non-magnetic support and the magnetic layer. The magnetic recording medium has excellent electromagnetic recording characteristics and torque characteristics and is suitable for high-density recording.

20 Claims, No Drawings

MAGNETIC RECORDING MEDIUM AND PRODUCTION METHOD THEREOF

FIELD OF THE INVENTION

The present invention relates to a magnetic recording medium, and more specifically to a magnetic recording medium suitable for high-density recording.

BACKGROUND OF THE INVENTION

Recently, it has been strongly required that a magnetic recording medium is in conformity with high-density recording. For the requirement, a magnetic recording medium using a magnetic recording thin film as a magnetic layer has been investigated and improvements in a magnetic recording particulate medium which is excellent for such reasons as productivity, durability, corrosion resistance, have been particularly extensively made.

The magnetic recording particulate medium is produced by coating a magnetic coating composition containing a ferromagnetic powder and a binder on a non-magnetic support such as a polyethylene terephthalate film, directly or via other layer, followed by drying to form a magnetic layer.

Hitherto a magnetic recording particulate medium, to improve, in particular, the self-demagnetization loss and the overwrite characteristics in high-frequency recording, it has been conventional to thin a magnetic layer. As the result thereof, a magnetic recording particulate medium having a thickness of the magnetic layer of 0.7 $\mu$m or thinner has been proposed. However, in this case, as the result of thinning the magnetic layer, there occurs a problem that the durability and surface property of the magnetic recording medium are deteriorated.

Accordingly, recently, a magnetic recording medium of a double-layer structure that a non-magnetic underlayer containing a non-magnetic powder and a binder is further formed between the magnetic layer and the non-magnetic support has been proposed. The magnetic recording medium of as such a double-layer structure has a feature that after forming the underlayer, the surface form of the underlayer is directly reflected on the surface of the magnetic recording medium. Also, the phenomenon becomes more remarkable in the case of thinning the magnetic layer. Usually, because the non-magnetic underlayer is also formed by coating as the magnetic layer, the coating condition and the drying condition become one factor for determining the surge form of the magnetic recording medium.

About the surface form of the magnetic recording medium, it is known that in particular, at high-density recording, the roughness of the surface of the magnetic recording medium influences the characteristics of the magnetic recording medium. That is, it has been practiced that by smoothing the surface of the magnetic recording medium, the magnetic recording medium is stably brought into contact with a magnetic head to improve the electromagnetic recording characteristics. In this case, as the indicator of the smoothness of the surface of the magnetic recording medium, a surface roughness Ra is used at present.

However, according to our investigations, it has been clarified that by simply smoothing a surface of the magnetic recording medium, that is, by reducing the Ra only, the torque characteristics of rotating components that move the magnetic recording medium in contact with a magnetic head are deteriorated. If the torque characteristics are bad, there occurs a problem that a head adsorption phenomenon occurs. On the other hand, when the surface roughness Ra is relatively increased to improve the torque characteristics, it is in a dilemma that the electromagnetic recording characteristics are reduced.

SUMMARY OF THE INVENTION

The present invention solves the above-described problems, and an object of the present invention is to provide a magnetic recording medium for high-density recording having excellent electromagnetic recording characteristics. Also, another object of the present invention is to provide a magnetic recording medium excellent in the torque characteristics. Still another object of the present invention is to provide a production method capable of producing the above-described magnetic recording medium.

That is, an aspect of the present invention is to provide a magnetic recording medium having a magnetic layer containing a binder and a ferromagnetic powder and having a thickness of 0.7 $\mu$m or thinner on a non-magnetic support, wherein the surface roughness Ra, according to standard nomenclature, of the surface of the magnetic recording medium is from 0.5 to 7 nm and the skewness $R_{SK}$, according to standard nomenclature, of the surface of the magnetic recording medium is 0.1 or lower.

Furthermore, another aspect of the present invention is to provide a production method of a magnetic recording medium, which comprises coating a coating composition for a nonmagnetic underlayer containing a binder and a non-magnetic powder on a non-magnetic support to form a non-magnetic underlayer and, after drying the coated layer, coating a coating composition for a magnetic layer containing a binder, a ferromagnetic powder, and a solvent, whereby a magnetic recording medium having a surface roughness Ra of the source of the medium is from 0.5 to 7 nm and a skewness $R_{SK}$ of the surface of the medium is 0.1 or lower is obtained.

DETAILED DESCRIPTION OF THE INVENTION

One of the features of the present invention is that the magnetic recording medium has a relatively thin magnetic layer of the thickness of 0.7 $\mu$m or thinner, the surface roughness of the surface of the magnetic recording medium is form 0.5 to 7 nm, and the skewness $R_{SK}$ of the surface thereof is 0.1 or lower. The skewness as referred to herein means the measure of the symmetry of the profile about the center line. That is, in the case of considering the sectional form of the surface, when the portions which becomes "hills" are large, the $R_{SK}$ tends to become a large value and when the portions which become "valleys" are large, the $R_{SK}$ tends to become a small value. The $R_{SK}$ is usually measured based on the following formula.

$$R_{SK} = \frac{1}{n(R_q)}\sum (Y_i)^3$$

wherein n is a data number, $R_q$ is a root-mean-square roughness, according to standard nomenclature, and $Y_i$ is the $i^{th}$ data value.

In the present invention, by making the surface roughness Ra to a certain range and also making the skewness to 0.1 or lower, both the recording characteristics and the torque characteristics can be improved.

The skewness is 0.1 or lower and preferably 0 or lower. If the skewness is too large, the torque characteristics a or recording characteristics are deteriorated. Also, the lower limit value of the skewness is usually about −1 for practical use. Also the source roughness of the surface of the magnetic recording medium is from 0.5 to 7 nm, preferably from 0.5 to about 6 nm, and more preferably from 0.5 to about 5 nm. The surface roughness is, in general, preferably small from the point of the electromagnetic recording characteristics but is usually 0.5 nm or larger.

The thickness of the magnetic layer is 0.7 $\mu$m or thinner, preferably 0.5 $\mu$m or thinner, and more preferably 0.3 $\mu$m or thinner for improving self-demagnetization loss and the overwrite characteristics in high frequency recording. If the thickness of the magnetic layer is thick, the magnetic recording medium becomes less suitable for high-density recording. Also. From the view point of the production, the thickness of the magnetic layer is usually 0.01 $\mu$m or thicker, a preferably 0.05 $\mu$m or thicker.

The magnetic layer contains a ferromagnetic powder and a binder. As the ferromagnetic powder, acicular metal oxide powders such as an iron oxide powder, a Co-modified iron oxide powder; acicular metal powders of a metal such as Fe, Co, Ni, or an alloy of these metals as main constituents. Hexagonal system ferromagnetic powders of barium ferrite, strontium ferrite, can be used, but to obtain a higher output, it is preferred to use the ferromagnetic acicular metal powder or the hexagonal system ferromagnetic powder.

Regarding ferromagnetic acicular metal powder, it is preferred to use such metal powder having a specific surface areas determined by the conventional BET method (or by an analogous Specific Surface Area method (SSA)) of at least 35 $m^2$/g, particularly at least 40 $m^2$/g. If the specific surface area is small, it is difficult to increase the packed amount of the ferromagnetic powder in the magnetic layer, which gives a tendency of becoming unsuitable for high-density recording. In regard to the magnetic characteristics of the ferromagnetic acicular metal powder, it is preferred that the saturated magnetization a, is at least 140 emu/g and the coercive force Hc is at least 1,500 Oe, and particularly at least 2,000 Oe. Also, as the form thereof, it is preferred that the mean long axis length (L) is 0.20 $\mu$m or shorter, and particularly 0.12 $\mu$m or shorter. The aspect ratio (K) thereof is preferably 10 or lower. If these values are outside of the above-described ranges, there is also a tendency toward being unsuitable for high-density recording.

Also, in regard to the hexagonal system ferromagnetic powder, it is preferred that the specific surface area determined by the conventional BET method is at least 40 $m^2$/g and the coercive force Hc is at least 1,500 Oe, and particularly at least 2,000 Oe. Also, it is preferred that the plate diameter L is 0.2 $\mu$m or shorter and the aspect ratio K is 10 or lower. If these values are outside the above-describe ranges, there is also a tendency toward being unsuitable for high-density recording.

It is desirable that the magnetic layer contains the ferromagnetic powder in an amount of usually from 50 to 90% by weight, preferably from 60 to 90% by weight, and more preferably from 65 to 80% by weight. If the ratio of the ferromagnetic powder in the magnetic layer is small, it is difficult to increase the recording density. On the other hand, if the ratio of the ferromagnetic powder is too large, the durability of the magnetic recording medium tends to be poorer.

As the binder used for the magnetic layer, it is preferred to use a resin excellent in the adhesive property with the non-magnetic support or the non-magnetic underlayer and having a glass transition point of from −100 to 150° C. and a number average molecular weight of from about 1,000 to 150,000, and particularly from about 10,000 to 50,000.

Examples of the resin which is usually used include polyurethane resins; polyester resins; cellulose derivatives such as cellulose acetate butyrate, as cellulose diacetate, nitrocellulose; vinyl chloride series resins such as vinyl chloride-vinyl acetate series copolymers, vinyl chloride-vinylidene chloride series copolymers, and vinyl chloride-acrylic series copolymers; various kinds of synthetic rubbers such as styrene-butadiene series copolymers; epoxy resins; phenoxy resins; and the like, that can be used singly or as a mixture of two or more kinds thereof.

It is preferred that he binder used for the magnetic layer has a polar group such as —PO(OM)$_z$, —OPO(OM)$_z$, —SO$_3$M, —OSO$_3$M, —COOM (wherein M represents H, Li, Na, K, NH$_2$, NH$_4$, etc.) The binder is preferably used in such concentration that he content in the magnetic layer becomes from 2 to 50% by weight, and particularly from 5 to 25% by weight.

Also, it is preferred that he binder forms a three-dimensional network structure in the magnetic layer by reacting with a crosslinking agent such as a low-molecular weight polyisocyanate compound having plural isocyanate groups. Thus, the mechanical strength of the magnetic layer can be improved. Such a low-molecular weight polyisocyante compound includes, for example, a trimethylol-addition product of tolidine isocyanate. It is preferred to use a crosslinking agent in a ratio of form 10 to 50% by weight to the weight of the resin as a binder.

The magnetic layer can further contain various kinds of usual additives such as a dispersing agent, a lubricant, an abrasive, an antistatic agent, and the like.

As the dispersing agent, it is preferred to use a dispersing agent having a phosphoric acid ester group such as a polyether phosphoric acid ester group, or a polyoxyethylene-alkylphenyl phosphoric acid ester group. The dispersing agent having such a phosphoric acid ester group includes phosphatidyl choline (lecithin), RE-610 (trade name, made by Kusumoto Kasei K.K.). Also, as the dispersing agent, in addition to the dispersing agent having a phosphoric acid ester group as described above, a fatty acid having form 12 to 18 carbon atoms, such as capric acid, lauric acid, myristic acid, oleic acid, linolic acid, alkali metal or alkaline earth metal salts of these fatty acids, that is, metal soaps, can be used together.

The using amount of the dispersing agent is in the range of usually from 0.1 to 10% by weight, and preferably from 1 to 5% by weight as a content in the magnetic layer.

As the lubricant, various kinds of lubricants such as aliphatic series, fluorine series, silicone series, or hydrocarbon series lubricants can be used.

As the aliphatic series lubricant, for example, fatty acids, metal salts of fatty acids, fatty acid esters, fatty acid amides, and fatty acid alcohols may be used. As fatty acids, for example, oleic acid, lauric acid, myristic acid, palmitic acid, stearic acid, and behenic acid may be used. As the fatty acid metal salts, for example, magnesium salts, aluminum salts, sodium salts, and calcium salts of the above-described fatty acids may be used. As the fatty acid esters, for example, the butyl esters, the octyl esters, and glycosides of the above-described fatty acids may be used. As the fatty acid amides, for example, in addition to the amides of the above-described fatty acids, linolic acid amide, caproic acid amide, may be used. As the fatty acid alcohols, for example, lauryl alcohol, myristyl alcohol, palmityl alcohol, stearyl alcohol, and oleyl alcohol may be used. As the fluorine series lubricants, for example, perfluoroalkyl polyether and perfluoroakylcarboxylic acid may be used. As the silicone series lubricants, for example, silicone oils and denatured silicone oils may be used.

Furthermore, solid lubricants such as molybdenum disulfide, tungsten disulfide, and phosphoric acid esters may be used. As the hydrocarbon series lubricants, for example, paraffins, squalane, and waxes may be used.

The lubricant is preferably used in such concentration that the content thereof in the magnetic layer is from 0.,1 to 10% by weight, and particularly form 1 to 7% by weight. In addition, in the case of the magnetic recording medium of a multilayer structure, the content of the lubricant can be change in each layer.

As the abrasives, for example, α-alumina, β-alumina, γ-alumina, α-iron oxide, silicon nitride, boron nitride, titanium oxide, silicon dioxide, tin oxide, zinc oxide, calcium carbonate, calcium sulfate, barium sulfate, molybdenum disulfide, tungsten oxide, silicon carbide, and chromium oxide may be used singly or as a combination thereof. Practical examples thereof include AKP-20, AKP-30, AKP-50, HIT-50, and HIT-100 (trade names, made by Sumitomo Chemical Company, Limited), TF-100, TF-120, and TF-140 (trade names, made by Toda Kogyo K.K.), FT-1000 and FT-2000 (trade names, made by Ishihara Sangyo Kaisha, Ltd.), STT-4D, STT-30, and STT-65C (trade names, made by The Nippon Chemical Industrial Co., Ltd.). In these materials, the abrasives having a relatively high hardness are suitably used. The mean particle size of the abrasives used in the present invention is preferably not larger than 0.5 μm. also, the amount of the abrasive(s) in the magnetic layers is preferably in the range of from 1 to 10% by weight.

As the antistatic agent, carbon black; metals and electric conductive compounds thereof; natural surface active agents such as saponin; nonionic surface active agents such as alkylene oxide series, glycerol series; cationic surface active agents such as higher alkylamines, quaternary ammonium salts, pyridinium salts, salts of other nitrogen-containing heterocyclic compounds; anionic surface active agents containing acidic groups such as a carboxylic acid group, a sulfonic acid group, a phosphoric acid group, a sulfuric acid ester group, a phosphoric acid ester; and amphoteric surface active agents such as amino acids, aminosulfonic acids, sulfuric acid esters or phosphoric acid esters of aminoalcohols, can be used. In addition, these antistatic acids can be used singly or as a mixture thereof. It is preferred to use carbon black, metals, and the electrically-conductive compounds of the metals.

As carbon black which can be suitably used as the antistatic agent in the present invention, acetylene black, furnace black, thermal lack can be used. Practical examples of carbon black include BLACKPEARLS 2000, 1000, 900, and 800, and VULCAN XC-72 (trade names, made by Cabot Corporation), RAVBN 880, 8000, and 7000 (trade names, made by Colombian Carbon Co.), and #3750B, #3750, #3250B, #3250, #950, #850B, #650B, #45, #40, 35, MA-77, and MA-7 (trade names, made by Mitsubishi Chemical Corporation). These carbon blacks can be used singly or as a combination of them. Also, the surface of a carbon black can be treated with a dispersing agent, or can be partially graphitized at use.

The electrically conductive compounds of metals such as tin oxide, indium tin oxide can be used.

The using amount of the antistatic agent in the magnetic layer is usually in the range of from 0.1 to 10% by weight. In addition, as is clear from the above description, according to the kind of the additive, the additive give plural effects.

Also, in the present invention, the magnetic layer can include a single layer or plural layers of two or more magnetic layers. For example, when the magnetic layer includes two layers, a high-density recording magnetic recording medium is prepared for recording data of a short wavelength onto the upper magnetic layer and servo signal of a long wavelength onto the lower magnetic layer. In this case, the upper magnetic layers is formed as the magnetic layer containing the ferromagnetic metal powder as described above and a binder, having a thickness of 0.7 μm or thinner and a surface roughness of 7 nm of lower, and the lower magnetic layer is formed by the magnetic layer containing the ferromagnetic powder having a specific surface area of at least 30 $m^2/g$ and a coercive force lower than that of the ferromagnetic powder used in the upper magnetic layer, such as, for example, $\gamma$-$Fe_2O_3$, barium ferrite, or α-iron oxide. The binder for the lower magnetic layer may be the same binder as used for the upper magnetic layer.

The lower magnetic layer and the upper magnetic layer can be formed by a successive coating method or a simultaneously coating method but the successive coating method is preferred because the interface between both the layers can be uniformly formed and in this case, it is preferred that after coating and drying of the lower magnetic layer, the upper magnetic layer is formed after reducing the residual solvent amount in an underlayer to not more than $1 \times 10^{-1}$ mg/$\mu m^3$, and particularly to not more than $1 \times 10^{-13}$ mg/$\mu m^3$. The magnetic layer is formed on a non-magnetic support directly or via another layer.

As the non-magnetic support, a conventionally used optional support can be used. Typical examples of the support used in the present invention include polyesters such as polyethylene terephthalate, polyethylene-2, 6-naphthalate; polyolefins such as polypropylene; cellulose derivatives such as cellulose triacetate, cellulose diacetate; and other plastics such as aramid, polycarbonate, and the like.

Also, there is no particular restriction on the form of the non-magnetic support but usually, the support is a film form or a tape form. In addition, to improve the adhesive property of the non-magnetic support and the magnetic layer, a corona discharge treatment or other surface treatment with a surface modifying agent such as an aqueous amine solution, trichloroacetic acid, phenols, etc., can be previously applied to the surface of the support.

In the present invention, because the thickness of the magnetic layer is 0.7 μm or thinner, to improve the durability and the surface property of the magnetic recording medium, it is very preferred to further form a non-magnetic underlayer containing non-magnetic particles and a binder between the magnetic layer and the non-magnetic support. The non-magnetic underlayer is usually formed in contact with both the magnetic layer and the non-magnetic support.

The non-magnetic particles used for the non-magnetic underlayer include inorganic substances such as titanium oxide, α-iron oxide, α-alumina, silicon carbonate, chromium oxide, cerium oxide, goethite, corundum, silicon nitride, silicon dioxide, tin oxide, magnesium oxide, zirconium oxide, calcium carbonate, calcium sulfate, barium sulfate, molybdenum disulfide, carbon black.

In this case, for the purpose of lowering the surface intrinsic resistance and also for the purposes of improving the stability of the coating liquid and keeping interface between the magnetic layer and the underlayer uniform in successive coating, preferably at least 90%, and more preferably at least 95% of the non-magnetic particles for the non-magnetic underlayer are carbon black. All the non-magnetic particles can be carbon black. The mean primary particle size of the carbon black used is usually from 10 to 100 nm, preferably from 15 to 50 nm, and more preferably from 15 to 30 nm. Also, the specific surface area determined by the conventional BET method of the carbon black used is preferably at least 100 $m^2/g$, and more preferably from 100 to 300 m²/g. Also, the DBP oil absorption, according to standard nomenclature of the carbon black used is usually from 50 to 300 g/100 cc, and preferably from 50 to 100 g/100 cc. The non-magnetic underlayer and the magnetic layer frequently contain an organic lubricant. In this case, when carbon black having too large particle sizes, a too small specific surface area, and the too small oil absorption is used, it sometimes happens that the action of keeping the organic lubricant is insufficient to reduce the durability of the magnetic recording medium.

Also, when the above-described inorganic material is used as the non-magnetic particles and the underlayer and the magnetic layer are simultaneously coated, the effect that the compatibility of each layer can be matched with each other is obtained.

As the binder used for the non-magnetic underlayer, it is preferred to use a binder excellent in the adhesive property with the non-magnetic support, in abrasion resistance, and having a glass transition point of from −100 to 150° C., and a number average molecular weight of from about 1,000 to 150,000, and preferably from about 10,000 to 50,000.

The resin usually used for the non-magnetic underlayer includes, for example, polyurethane resins; polyester resins; cellulose derivatives such as cellulose acetate butyrate, cellulose diacetate, nitrocellulose; vinyl chloride series resins such as vinyl chloride-vinyl acetate series copolymer, vinyl chloride-vinylidene chloride series copolymers, vinyl chloride-acrylic series copolymers; various kinds of synthetic rubbers such as a styrene-butadiene copolymer; epoxy resins; and phenoxy resins. They can be used singly or as a mixture of two or more kinds of them.

The binder is preferably used in such concentration that the content thereof in the non-magnetic under layer is from 2 to 50% by weight, and particularly from 5 to 35% by weight. It is preferred that the binder forms a three-dimensional network structure in the non-magnetic underlayer by reacting with a crosslinking agent such as a low-molecular weight polyisocyanate compound having plural isocyanate groups, for example, a trimethylolpropane-addition product of tolidine diisocyanate as described above in regard to the magnetic layer.

The non-magnetic underlayer can, if desired, further contain other components. For example, an organic lubricant such as a fatty acid or a fatty acid ester is incorporated in the underlayer and the lubricant can diffuse slightly onto the surface of the magnetic layer. As the organic lubricant, various kinds of lubricants described above for the magnetic layer can be used.

The magnetic recording medium of the present invention can be produced by coating and drying a coating composition for the magnetic layer containing the components constituting the magnetic layer and a solvent on a non-magnetic support directly or via other layer. Preferably, by coating a coating composition for a non-magnetic underlayer containing the components constituting the non-magnetic underlayer and a solvent and the above-described coating composition for the magnetic layer on a non-magnetic support simultaneously or successively, a magnetic recording medium having the non-magnetic underlayer between the magnetic layer and the nonmagnetic support is produced.

As the solvent for the coating composition for the magnetic layer and for the coating composition for the non-magnetic underlayer, for example, ketones such as methyl ethyl ketone, methyl isobutyl ketone, cyclohexanone; alcohols such as methanol, ethanol, propanol, isopropyl alcohol esters such as methyl acetate, ethyl acetate, butyl acetate; ethers such as diethyl ether, tetrahydrofurons aromatic hydrocarbons such as benzene, toluenexylene; and aliphatic hydrocarbons such as hexane can be used.

The coating composition for the magnetic layer or the coating composition for the non-magnetic underlayer can be formed as a uniform coating composition by kneading and dispersing the components constituting the magnetic layer or the non-magnetic underlayer together with the solvent. Kneading and dispersing can be carried out according to an ordinary method using a kneading apparatus and dispersing apparatus of conventional types.

The coating method can be carried out according to an ordinary method using an ordinary coating method such as a gravure coating method, a roll coating method, a blade coating method, an extrusion coating method, or the like.

In the case of forming the non-magnetic underlayer between the magnetic layer and the non-magnetic support, the coating composition for the magnetic layer and the coating composition for the non-magnetic underlayer can be simultaneously coated but in the point of forming a uniform interlayer between the magnetic layer and the non-magnetic support, it is preferred to coat the coating composition for the magnetic layer after coating the coating composition for the non-magnetic underlayer and drying. In this case, preferably, the coating composition for the non-magnetic underlayer is coated on a non-magnetic support to form the non-magnetic underlayer and, after drying the non-magnetic underlayer until the residual solvent amount in the non-magnetic underlayer becomes $1\times10^{-11}$ mg/$\mu$m or lower, and particularly $1\times10^{-13}$ mg/$\mu$m or lower, the coating composition for the magnetic layer is coated. In this case, the disturbance of the interlayer between the magnetic layer and the support can be restrained in minimum, whereby a magnetic recording medium having excellent electromagnetic recording characteristics, in particular, giving less noise can be obtained and at the same time, the total solvent amounts after coating both layers can be reduced to form the magnetic recording medium having excellent durability. Also, in the case of forming the non-magnetic underlayer, the state of the surface of the underlayer (the interlayer between the non-magnetic underlayer and the magnetic layer) gives a large influence on the surface of the magnetic recording medium defined by the present invention. Accordingly, the control of the surface of the magnetic recording medium is difficult as compared with the case of directly forming the magnetic layer on the non-magnetic support. Therefore, by successively coating the nonmagnetic underlayer and the magnetic layer as described above, not only the control of the interface between the magnetic layer and the non-magnetic underlayer but also the control of the roughness of the surface of the magnetic recording medium defined by the present invention can be easily carried out.

After coating the coating composition for the magnetic layer, usually, a magnetic field is applied thereto before drying the coated layer. Also, after drying the coated magnetic layer, the layer is subjected to a calender treatment to smoothen the surface.

In the present invention, the $R_{SK}$ and Ra are influenced by the surface roughness of the non-magnetic support, the surface roughness of the non-magnetic underlayer, the voids of the non-magnetic underlayer, the specific surface area of the non-magnetic particles used for the non-magnetic underlayer, the particles sizes of the ferromagnetic powder contained in the magnetic layer, the particle sizes of the various additives such as carbon black, alumina, the dispersing property of the coating composition for the magnetic layer, the calender treatment after drying the magnetic layer. Accordingly, to make the $R_{SK}$ and Ra the above-described ranges, it is necessary to properly select the above-described conditions. In particular, for the $R_{SK}$, the condition of the calender treatment is important, the value of the $R_{SK}$ is largely changed by the quality of the materials and the temperature for calendering, the linear pressure, the calendering times, and the like.

As the rolls used for the calender treatment, usually a combination of metallic rolls and synthetic resin-made rolls having a heat resistance is used but metallic rolls only can be used. The treatment temperature is usually from 70 to 120° C. and the linear pressure is preferably from 200 to 500 kg/cm. As a matter of course, the values of $R_{SK}$ and Ra are not determined by only the condition of the calender treatment and thus, it is necessary to combine various conditions including the calender treatment times.

In addition, when the coating composition for the magnetic layer contains the crosslinking agent as the trimethylolpropane-addition product of tolidine diisocyanate, usually, a curing treatment of maintaining for from 24 to 160 hours at a temperature of from 50 to 90° C. is carried out to cause the crosslinking reaction of the binder and the crosslinking agent.

According to the present invention, a magnetic recording medium excellent in both the electromagnetic recording characteristics and the torque characteristics can be provided. In particular, the above-described magnetic recording medium suitable for high-density recording can be provided.

The following Examples are intended to illustrate the present invention more practically but not to limit the invention in any way. In addition, all parts in these Examples, unless otherwise indicated, are by weight.

Coating composition for non-magnetic underlayer:

| | |
|---|---|
| Carbon black (mean primary particle size 24 nm, specific surface area determined by the BET method = 138 m²/g, DBP oil absorption = 60 ml/100 g, Mogul L, made by Cabot Corporation) | 100 parts |
| Polyester-polyurethane resin (number average molecular weight 10500, weight average molecular weight 63000, Tq = 25° C., CA2250, made by Morton Co.) | 30 parts |
| Tridicyl stearate | 13 parts |
| Oleic acid | 2 parts |
| Tetrahydrofuran | 435 parts |

Coating composition for mangetic layer:

| | |
|---|---|
| Ferromagnetic metal powder (Fe/Co = 85/15, $\sigma_s$ = 149 mu/g, Hc = 1730 Oe, specific surface area determined by the BET method = 43 m²/g) | 100 parts |

-continued

| | |
|---|---|
| Vinyl chloride series copolymer (containing -SO₃Na, -OH, and epoxy group, polymerization degree 13000, MR-113, made by Nippon Zeon Co., Ltd) | 14 parts |
| Polyester-polyurethane resin (number average molecular weight 15,000, weight average molecular weight 25,000, Tg = 30° C., Vylon UR8300, made by Toyobo Co., Ltd.) | 4 parts |
| α-Alumina (mean particle size 0.5 μm) | 21 parts |
| Carbon black (1) (furnace black, mean primary particle size 28 nm, BET = 240 m²/g, DBP oil absorption = 165 ml/100 g) | 4 parts |
| Carbon black (2) (thermal black, mean primary particle size 80 nm, BET = 24 m²/g, DBP oil absorption = 28 ml/100 g) | 4 parts |
| Tridicyl stearate | 9 parts |
| Oleic acid | 1 part |
| Tetrahydrofuran | 520 parts |

After adding 4 parts of diphenylmehylene diisocyanate (Mondur MR, trade name, made by Mobay Co.) to the coating composition for the non-magnetic underlayer and 2 parts of the diisocyanate to the coating composition for the magnetic layer, each of the coating compositions was filtered using a filter having a mean pore size of 1 μm to provide each coating composition.

The coating composition for the underlayer prepared as described above was coated on a polyethylene terephthalate film of 62 μm in thickness and sufficiently dried.

Then, the coating composition for the magnetic layer was coated thereon by an extrusion system at a dry thickness of 0.30 μm and dried at 80° C. Then, after applying a calender treatment at 100° C. and 340 kg/cm, the magnetic recording medium obtained was punched into a disk form. The disk was maintained at 70° C. for 48 hours to carry out a curing treatment.

EXAMPLE 1

After adding 50 parts of cyclohexanone to the coating composition for the non-magnetic underlayer, the coating composition was coated at a dry thickness of 1 μm and the calender treatment after forming the magnetic layer was carried out thrice.

EXAMPLE 2

The thickness of the non-magnetic under layer was 1 μm and the calender treatment after forming the magnetic layer was carried out twice.

EXAMPLE 3

The thickness of the non-magnetic underlayer was 2 μm and the calender treatment after forming the magnetic layer was carried out thrice.

Comparative Example 1

The non-magnetic powder used for the non-magnetic underlayer was changed from 100 parts of carbon black to a mixture of 40 parts of carbon black and 60 parts of an iron oxide powder, the coating composition for the underlayer was coated at a dry thickness of 1 μm, and the calender treatment after forming the magnetic layer was carried out thrice.

Comparative Example 2

The non-magnetic powder used for the non-magnetic underlayer was changed from 100 parts of carbon black to a mixture of 15 parts of carbon black and 85 parts of an iron oxide powder, the coating composition for the underlayer was coated at a dry thickness of 1 μm, and the calender treatment after forming the magnetic layer was carried out thrice.

Comparative Example 3

The thickness of the non-magnetic underlayer was 1 μm and the calender treatment after forming the magnetic layer was carried out once.

The characteristics of the magnetic recording media obtained by the above-described methods were measured by the following methods. The results are shown in Table 1 below.

Residual Solvent Amount:

The residual solvent amount was measured by gas chromatography (GC-5A, trade name, made by Shimadzu Corporation). Column length 1 meter, filler "Chromosorb 101" (trade name, made by Johns Manville Co.), column bath temperature 180° C. Helium was used as a carrier gas and was let flow at a speed of 50 meters/minute. The sample was heated to 150° C. to evaporate a residual solvent, which was measured.

Surface Roughness (Ra, $R_{SK}$):

The surface roughness was measured using a non-contact three-dimensional surface roughness meter (manufactured by WYKO Co.). The measurement was carried out by a measuring wavelength of 665.8 nm, the lens magnification of 40.4 magnifications, and at a PSI mode. The measurement was carried out at 8 points in each sample and the average value of them was used.

Torque:

The torque was measured using a ZIP disk driving apparatus, manufactured by Iomega Co. The torque of each sample was shown by the relative value when the torque of the sample of Example 1 was defined as 100.

Output:

The output was measured using a ZIP disk driving apparatus manufactured by Iomega Co., at a writing frequency of 9,400 KHz. a number revolutions of 2,950 rpm, and the measured position of radius R=38 mm. The output of each sample was shown by the relative value when the output of the sample of Example 1 was defined as 100.

The above measurements are tabulated in the following Table 1.

TABLE 1

| Residual solvent amount before coating the upper layer | Example 3 | Example 1 | Example 2 | Comparative Example 1 | Comparative Example 2 | Comparative Example 3 |
|---|---|---|---|---|---|---|
| Surface roughness Ra | 5.06 | 5.06 | 6.38 | 6.20 | 7.43 | 5.18 |
| $R_{SK}$ | −0.03 | 0.02 | 0.00 | 0.28 | 0.22 | 0.16 |
| Output | 104 | 100 | 101 | 82 | 74 | 105 |
| Torque | 104 | 100 | 64 | 113 | 76 | 140 |

What is claimed is:

1. A magnetic recording medium comprising:
   a non-magnetic support including a non-magnetic layer formed thereon containing a binder and non-magnetic particles including carbon black in a ratio by weight of about 2 to 50 parts binder to 100 parts non-magnetic particles; and
   a magnetic layer formed on the non-magnetic layer containing a binder and a ferromagnetic powder and having a thickness not greater than about 0.7 μm, wherein the surface roughness Ra of the surface of the magnetic recording medium is in the range from 0.5 to 7 nm and the skewness $R_{SK}$ of the surface of the magnetic recording medium is 0.1 or lower.

2. A magnetic recording medium of claim 1, wherein $R_{SK}$ is 0 or lower.

3. A magnetic recording medium of claim 1, wherein the ferromagnetic powder contains an acicular metal powder.

4. A magnetic recording medium of claim 3, wherein the specific surface area of the acicular metal powder determined by the BET method is at least 35 $m^2/g$.

5. A magnetic recording medium of claim 3, wherein the coercive force of the acicular metal powder is at least 1,500 Oe.

6. A magnetic recording medium of claim 3, wherein saturated magnetization of the acicular metal powder is at least 140 emu/g.

7. A magnetic recording medium of claim 3, wherein the mean long axis length of the acicular metal powder is 0.20 μm or shorter.

8. A magnetic recording medium of claim 3, wherein the aspect ratio of the acicular metal powder is 10 or lower.

9. A magnetic recording medium of claim 1, wherein the ferromagnetic powder contains a hexagonal system ferromagnetic powder.

10. A magnetic recording medium of claim 9, wherein the coercive force of the hexagonal system ferromagnetic powder is at least 1500 Oe.

11. A magnetic recording medium of claim 9, wherein the plate diameter of the hexagonal system ferromagnetic powder is 0.2 μm or shorter.

12. A magnetic recording medium of claim 9, wherein the aspect ratio of the hexagonal system ferromagnetic powder is 10 or lower.

13. A magnetic recording medium of claim 1, wherein the mean primary particle size of the carbon black is in the range from 15 to 30 nm.

14. A magnetic recording medium of claim 1, wherein the specific surface area of the carbon black determined by the BET method is in the range from 100 to 300 $m^2/g$.

15. A magnetic recording medium of claim 1, wherein the DBP oil absorption of the carbon black is in the range from 50 to 100 g/100 cc.

16. A magnetic recording medium according to claim 1 in which the thickness of the non-magnetic layer is at least approximately 1 micron.

17. A magnetic recording medium according to claim 1 including a lubricant in the non-magnetic layer.

18. A magnetic recording medium according to claim 17 in which the lubricant includes one of a fatty acid and fatty acid ester.

19. The magnetic recording medium according to claim 1 wherein the ratio is about 30 parts binder to 100 parts non-magnetic particles.

20. A magnetic recording medium according to claim 1 in which the surface roughness of the surface of the magnetic recording medium is non-abrasively established.

* * * * *

UNITED STATES PATENT AND TRADEMARK OFFICE
CERTIFICATE OF CORRECTION

PATENT NO. : 6,207,252 B1
DATED : March 27, 2001
INVENTOR(S) : Osamu Shimomura

It is certified that error appears in the above-identified patent and that said Letters Patent is hereby corrected as shown below:

<u>Column 12, claim 1,</u>
Line 3, insert after the word particles --, wherein at least 90% of said non-magnetic particles in said non-magnetic layer are carbon black particles --

Signed and Sealed this

Thirteenth Day of November, 2001

*Attest:*

Nicholas P. Godici

NICHOLAS P. GODICI
*Attesting Officer*  *Acting Director of the United States Patent and Trademark Office*